United States Patent
Wendt

[19]

[11] Patent Number: 6,138,425
[45] Date of Patent: *Oct. 31, 2000

[54] SPLICE CLIP FOR DRYWALL SUSPENSION GRID

[75] Inventor: Alan C. Wendt, Barrington, Ill.

[73] Assignee: USG Interiors, Inc., Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/991,936

[22] Filed: Dec. 16, 1997

[51] Int. Cl.[7] ...................................................... E04B 9/12
[52] U.S. Cl. .................. 52/506.07; 52/98; 52/655.1; 52/665; 52/712; 403/205; 403/403
[58] Field of Search ........................... 52/506.06, 506.07, 52/506.08, 506.09, 726.1, 726.2, 98, 100, 712, 655.1, 665, 714, 715, 656.9; 403/403, 205, 119

[56] References Cited

U.S. PATENT DOCUMENTS

| | | |
|---|---|---|
| 2,990,921 | 7/1961 | Wilde . |
| 3,284,977 | 11/1966 | Lickliter et al. . |
| 4,245,446 | 1/1981 | Judkins .................................. 52/232 |
| 4,479,341 | 10/1984 | Schuplin ................................ 52/665 |
| 4,580,387 | 4/1986 | Rogers .................................. 52/665 |
| 4,766,707 | 8/1988 | Knudson ................................. 52/98 |
| 4,873,809 | 10/1989 | Paul .................................... 52/489 |
| 5,428,930 | 7/1995 | Bagley et al. ...................... 52/506.07 |
| 5,678,379 | 10/1997 | Auattrociocchi ....................... 52/712 |
| 5,797,694 | 8/1998 | Breivik ................................ 403/231 |

OTHER PUBLICATIONS

Chicago Metallic Catalog—1 page, System Nos. 630 and 640/650 (transition soffits)(undated).
Armstrong World Industries, Inc. technical product catalog for drywall ceiling systems and accessories—7 pages: "Drywall Accessories" dated EFF. Jan. 1, 1995; Type "F" flourescent light fixture in drywall ceiling drawing No. KW051944 dated Jun. 8, 1994; Drywall Access Door in drywall ceiling drawing No. KW051804 dated Jun. 17, 1994; Drywall Clip for ⅝" gypsum board (item No. 8878) and vertical bottom clip 15/16" flange (item No. 8880) undated; vertical bottom clip 1–½" flange (item No. 8881) and drywall furring shoe/foot 1–½" flange (item No. 8887) undated; drywall furring shoe 15–16" flange (item No. 8883) and drywall furring shoe combo 1–½" –15–16" flange (item No. 8889) undated; and "New York City Clip" black iron to tee bulb (item No. 7897–_) and drywall furring shoe 1–½" flange (item No. 8882) undated.

*Primary Examiner*—Carl D. Friedman
*Assistant Examiner*—Yvonne M. Horton
*Attorney, Agent, or Firm*—Lee, Mann, Smith, McWilliams, Sweeney & Ohlson; David F. Janci; John M. Lorenzen

[57] ABSTRACT

The present invention is a clip used in the construction of suspended ceiling grid systems for the hanging of drywall or other panels. The clip provides a versatile means of joining two suspended grid beams at various points of transition between two grid beams, such as a transition in the ceiling surface, thus eliminating the need for a different means of joining in each situation.

22 Claims, 4 Drawing Sheets

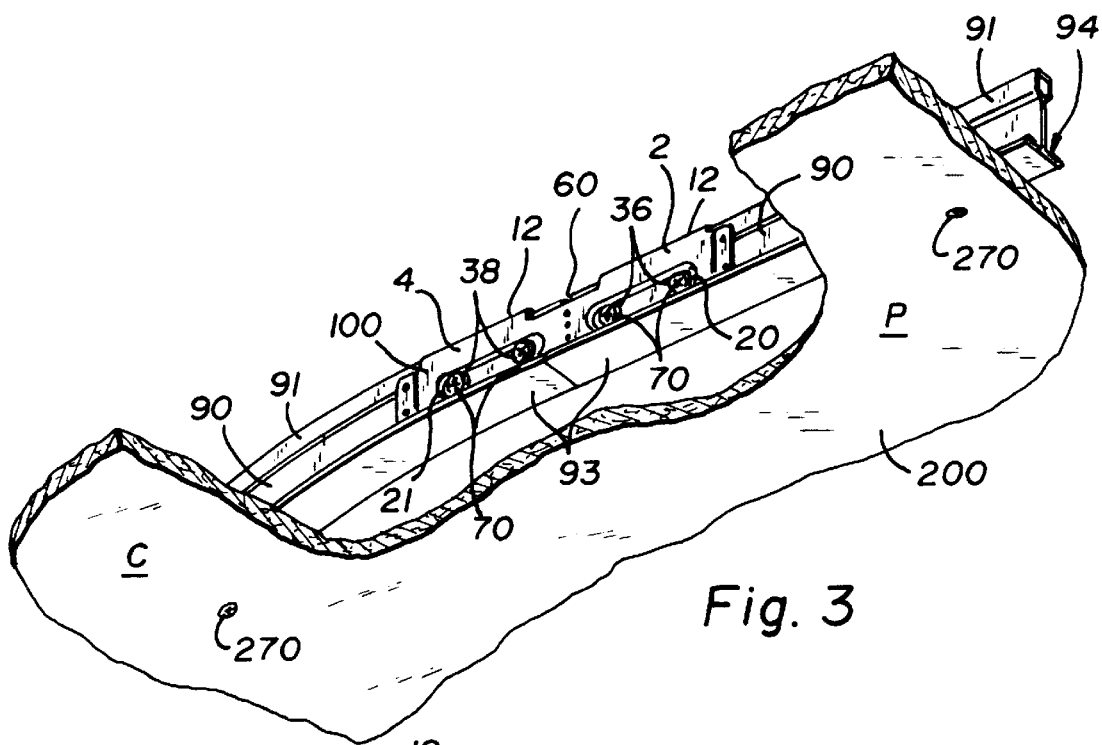
Fig. 3
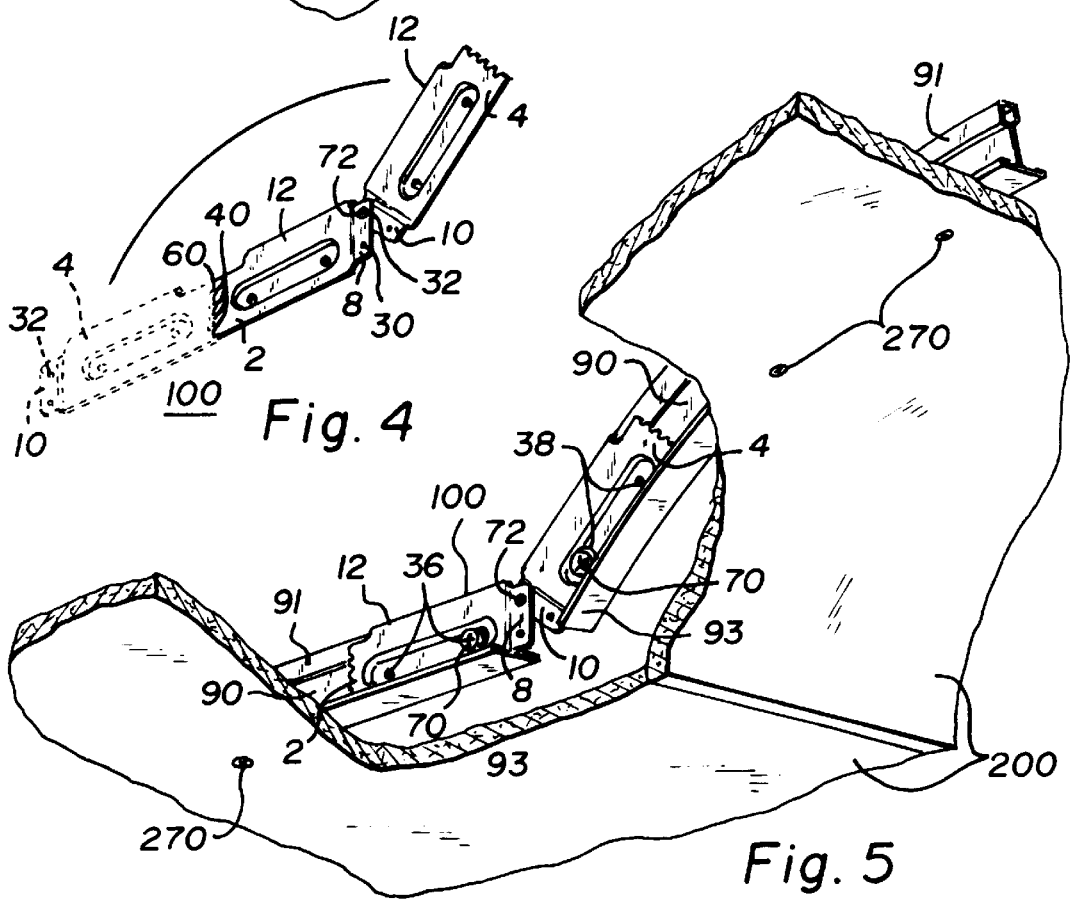
Fig. 4
Fig. 5

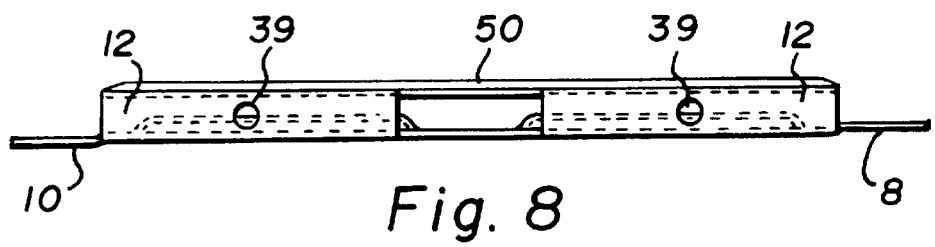
Fig. 8
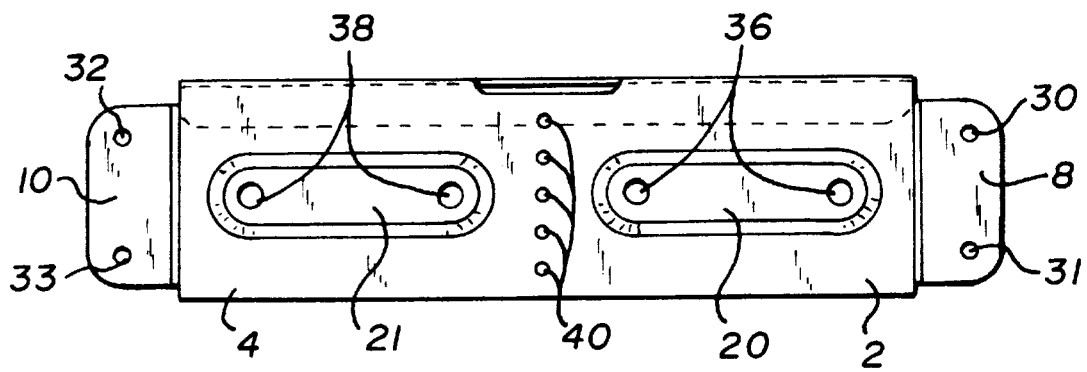
Fig. 9
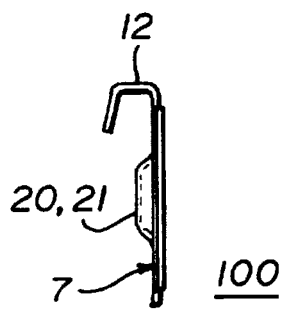
Fig. 10
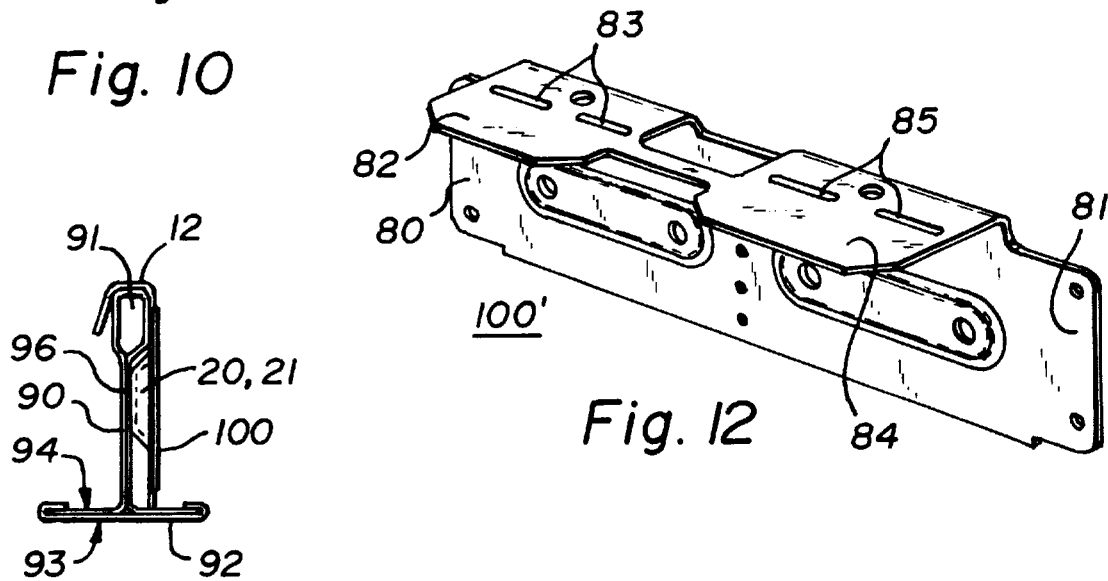
Fig. 11
Fig. 12

SPLICE CLIP FOR DRYWALL SUSPENSION GRID

BACKGROUND OF THE INVENTION

The present invention relates to suspended ceiling systems, which often include changes in surface planes or changes in the orientation of the ceiling frame members to accommodate ceiling fixtures, such as light fixtures. Such suspended ceilings are typically constructed using suspended "T" grid beams, joined to form a supporting grid system typically upon which drywall or lay-in acoustical panels can be mounted. This grid system is usually referred to as suspension grid. A "T" grid beam is an elongated beam with a flange at the bottom of the beam, a vertical center web portion, and a thicker "bulb" portion at the top end of the center web portion of the beam. Thus, the cross section of the beam resembles an inverted "T" shaped configuration. Some "T" grid beams may not have a thicker "bulb" portion, but are still functionally similar. The bottom surface of the flange at the bottom of the beam provides the grid face for the attachment of drywall or other panels. Lay-in type panels, such as acoustical panels, can also be laid upon the top surface of the flange. Typically, these grid beams are made of extruded aluminum or roll-formed steel, and can be straight or curved. These grid beams are typically joined together by clips, the subject of the present invention, allowing construction of the grid system.

Suspended "T" grid provides the easiest way of dealing with surface changes in the construction of a suspended ceiling, or to accommodate design detail for the installation of ceiling fixtures. "T" grid beams well known in the art are equipped with slots, or openings, in the center web portion of the "T" grid beam and are located along the beam at standard intervals. These slots provide for the connection of other beams by various means well known in the art. However, there are some situations where a grid beam needs to be joined to another grid beam at a point where no slots or openings are provided. For example, typical ceiling light fixtures and HVAC vents require a rectangular framed opening in the ceiling to accommodate the fixture. This fixture opening often creates a need to connect the terminating end of a grid beam to a transverse grid beam used in constructing the opening for the fixture at a point on the grid beam that is between the standard interval of slots provided in the center web portion of the grid beam. The construction of surface changes and fixture frames involves extensive on site fabrication of the grid and developing a means of securing each grid beam together. Prior art clips for suspended "T" grid beams address the problem of transitional surfaces or transitions in beam orientation to accommodate ceiling fixtures by offering a different clip for each condition or design detail. One of the problems with these prior art clips is that because of the need for a different clip for each transition detail, numerous clips are required for the various transitions encountered in suspended grid construction. Having to maintain a supply of so many different clips for each situation is very costly and also affects the efficiency of suspended drywall ceiling construction.

It is therefore an object of the present invention to provide a clip for joining drywall suspension grid together at points of transition that will secure suspension grid beams in more than just one configuration in a suspended drywall ceiling.

It is also an object of the present invention to provide a clip for splicing two suspension grid beams together at points where the suspension grid runs longer than the length of one grid beam.

It is also an object of the present invention to provide a clip for joining suspension grid where one grid beam end terminates at a second transverse beam at a point where a standard slot in the center web portion of the transverse beam is not located, such as at a point where transverse beams are used to form a rectangular frame to accommodate a recessed light fixture in the ceiling.

It is also an object of the present invention to provide a clip which is adapted for use with various grid face sizes, such as the 1 5/16 inch and the 1½ inch grid face sizes.

It is a further object of the present invention to provide a clip that does not create a "build-up" of material thickness at the points of attachment on the grid face surface upon which the drywall is attached.

SUMMARY OF THE INVENTION

The invention is a clip used to join two suspended "T" grid beams utilized in a suspension grid at a point of transition. Typical transition points include a change in ceiling surfaces at a point between two grid beams, a change in grid beam orientation at a ceiling fixture, or at a point where two co-linear grid beams are spliced together to form an extended grid beam. The clip is a substantially flat member having similar features at both ends, thus integrally comprising two halves. Each clip half has an extended flange with holes therein at the outermost edge of the clip half. These extension flanges allow further attachment options as disclosed in this specification. The clip also has a retainer member, such as a channel or bendable tabs, formed along the top edge of the clip on both halves of the clip. In a preferred embodiment, the retainer member is a channel. The channel accepts the "bulb" of the top edge of the suspended "T" grid beam by inserting the "bulb" into the channel. In the preferred embodiment, two oval shaped bosses are located on each clip half and run parallel to the clip length. The raised portion of these bosses are on the side of the clip where the channel is located. These bosses allow surface contact with the vertical center web portion of the suspended "T" grid beam. The holes through the bosses further allow attachment of the suspended "T" grid beam to the clip by the use of screws, or other similar attachment means. The clip has a zone of weakened material at the midpoint of the clip. In a preferred embodiment of the clip, this weakened zone is formed by a line of perforated holes at the midpoint of the clip, thus dividing the two integral halves of the clip. The weakened zone may also be formed by slots, an embossed crease, or a crease created by a "V" punch or other similar method well known in the art of metal forming.

In a preferred embodiment of the invention, the clip is formed from 22 gauge cold rolled galvanized steel. The oval bosses are stamped into the steel. One hole is punched through the steel at each end of the oval boss. At least one hole is punched through the top surface of the retainer channel on each of the halves. The channel of the preferred embodiment is formed by bending the steel twice at a distance equal to the width of the channel, thus forming a channel. This width is sized to allow the "bulb" portion of the suspended "T" grid beam to be inserted into the formed channel. The outer, or second bend, of the channel is left at an angle greater than 90 degrees to the first bend, thus allowing the channel to easily fit over the "bulb" portion of the suspended "T" grid beam. In an alternate embodiment of the clip, manually field bendable tabs are provided for securing the clip to the "bulb" portion of the "T" grid beam, instead of the channels.

In the preferred embodiment, a notch in the top surface of the channel spanning the midpoint of the clip provides for separation or bending of the two halves of the clip along the weakened material zone, while still leaving remaining portions of the channel to give adequate strength to the clip when it is used in its normal co-linear configuration. However, when the clip is bent or severed, the remaining portion, or spine, of the channel is removed to allow for easier bending or severing. Two holes are also formed through each of the extension flanges of the clip.

The clip may be used to splice together two longitudinally aligned, or co-linear grid beams at abutting ends. This configuration accommodates portions of the suspended grid where the grid runs longer than the length of a single grid beam.

The clip may also be bent along the zone of weakened material at any angle, typically at a 90 degree angle, thus allowing attachment of two suspended "T" grid beams at a point of intersection of the two beams. This configuration accommodates attachment of a terminating end of a suspended "T" grid beam to a transversely oriented suspended "T" grid beam where the terminating end is at a point on the grid beam that is between the standard interval of slots provided in the center web portion of the grid beam. This situation may be encountered, for example, when forming a rectangular frame for ceiling fixtures.

The clip may also be bifurcated along the zone of weakened material, thus creating two pieces, or halves, of the clip. The pieces may then be attached by reversing the orientation of one half and using one hole on each extension flange to receive a pivot pin, or the like, therethrough. This allows each piece to pivot relative to the other piece. This configuration provides attachment of two suspended "T" grid beams at a transition point in the planar surfaces of the suspended grid. The attachment may also involve a curved suspended "T" grid beam and a straight suspended "T" grid beam, thus allowing a transition from a planar surface to a curved surface. Likewise, it is possible to attach two curved suspended "T" grid beams. In a preferred embodiment of the invention, the two extension flanges are offset in opposing directions, thus allowing the connection of the two generally flat clip halves, or pieces, to be co-planar and thereby aligning the separate channel portions of the two separated clip pieces. However, the two extension flanges do not have to be offset.

BRIEF DESCRIPTION OF THE DRAWINGS

FIG. 3 is a detailed view of FIG. 2 showing a splice clip connection between a curved suspended "T" grid beam and a straight suspended "T" grid beam in a suspended "T" grid system.

FIG. 4 is a perspective view of a clip severed along the weakened zone, thus creating two extension pieces. One piece is reversed 180° to the other. The pieces are pivotally joined at the upper holes through the offset extension flanges, thus allowing the two pieces to pivot in relation to each other.

FIG. 5 is a detailed view of FIG. 2 showing a severed pivotal clip as in FIG. 4 for a connection between a straight suspended "T" grid beam and a curved suspended "T" grid beam, thus forming a point of transition between a planar surface and a curved surface.

FIG. 8 is a top view of the clip showing the channel positioned on one side and the offsets in the extension flanges on each end of the clip.

FIG. 9 is a front view of the clip.

FIG. 10 is an end view of the clip.

FIG. 11 is an end view of the clip attached to a suspended "T" grid beam with the "bulb" portion of the suspended "T" grid beam captured by the channel on the top edge of a clip half.

FIG. 12 is a perspective view of an alternate embodiment of the clip having the grid beam retainer member formed as bendable tabs for securing the clip to the "T" grid beam and non-offset extension flanges.

DETAILED DESCRIPTION OF THE INVENTION

Figure 1:
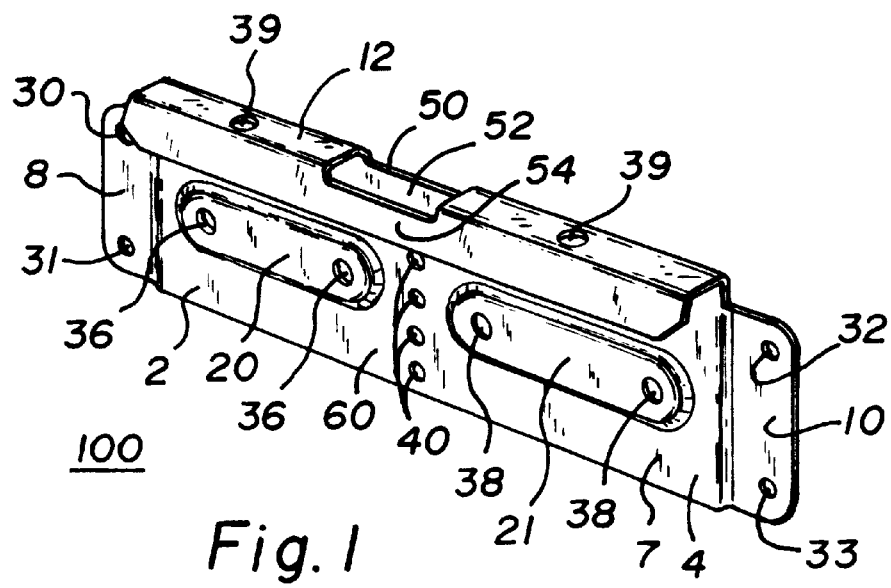
FIG. 1 is a perspective view of the clip.

The clip 100 is essentially a straight bracket integrally comprising a first clip half 2 and a second clip half 4, as shown in FIG. 1. The first clip half 2 and the second clip half 4 meet at a clip midpoint 60. The clip halves 2 and 4 are also interchangeably referred to herein as clip pieces 2 and 4. A bendable and severable zone of weakened material is formed across clip midpoint 60. In the preferred embodiment, this zone of weakened material is a line of perforated holes 40. The weakened zone at the perforated holes 40 allow the clip 100 to be bent or severed at the clip midpoint 60, thus allowing the clip 100 to be used in more than just one attachment configuration in a suspended ceiling. The weakened zone may also be formed by slots, grooved, such as by making an embossed crease, or a crease created by a "V" punch or other similar method well known in the art of metal forming. These features would also allow the clip 100 to be bent or severed at the clip midpoint 60. In the preferred embodiment of the invention, the clip 100 is made from metal, such as 22 gauge galvanized steel. Other metals or other materials, such as plastic or composite materials, may also be used. FIGS. 8–10 show the details of the clip 100.

In the preferred embodiment of the invention, as shown in FIGS. 1 and 8–10, a retainer channel 12 is formed along top edge 50 of the clip 100. The retainer channel 12 is formed by procedures well known in the art of metal forming and fabrication. The retainer channel 12 is formed so that it is positioned along an inner bearing surface 7 side of the clip 100, and is bent to form an open angle at about 110 degrees, so that the retainer channel 12 is splayed open, as shown in FIG. 10. A notch 52 is formed in the retainer channel 12 spanning the clip midpoint 60, as shown in FIG. 1. The notch 52 allows the clip 100 to be severed or bent along the perforated holes 40 more easily, while leaving sufficient material remaining, shown at spine 54, to provide adequate stiffness and rigidity to the clip 100 when it is used in its normal unbent one-piece, co-linear, configuration. When the clip 100 is bent or severed, the remaining portion, the spine 54, of the retainer channel 12 is removed to allow for easier bending or severing.

The weakened zone, or line, at the perforated holes 40 is preferably perpendicular to the top edge 50, but could be formed at any non-parallel relationship to the edge 50.

A first extension flange 8 extends from the end of the first clip half 2 and a second extension flange 10 extends from the end of the second clip half 4. In a preferred embodiment, the first extension flange 8 is offset from the clip 100 towards the inner bearing surface 7, while the second extension flange 10 is offset in the opposite direction.

An oval boss 20 is formed on the surface of the first clip half 2 of the clip 100 and an oval boss 21 is formed on the surface of the second clip half 4 of the clip 100, both of the oval bosses 20 and 21 being oriented parallel to the retainer channel 12. Both of the oval bosses 20 and 21 project outwardly from the inner bearing surface 7 of the clip 100, as shown in FIG. 10. In the preferred embodiment of the invention, the oval bosses 20 and 21 are formed by punching means well known in the art of metal forming and fabrication.

Various holes are formed through the clip 100 to allow versatile fastening options. Holes 30 and 31 are formed through the first extension flange 8 and holes 32 and 33 are formed through the second extension flange 10, as shown in FIG. 1. Holes 36 are formed through the oval boss 20 and holes 38 are formed through the oval boss 21. Holes 39 are formed through the top surface of the retainer channel 12.

Figure 2:
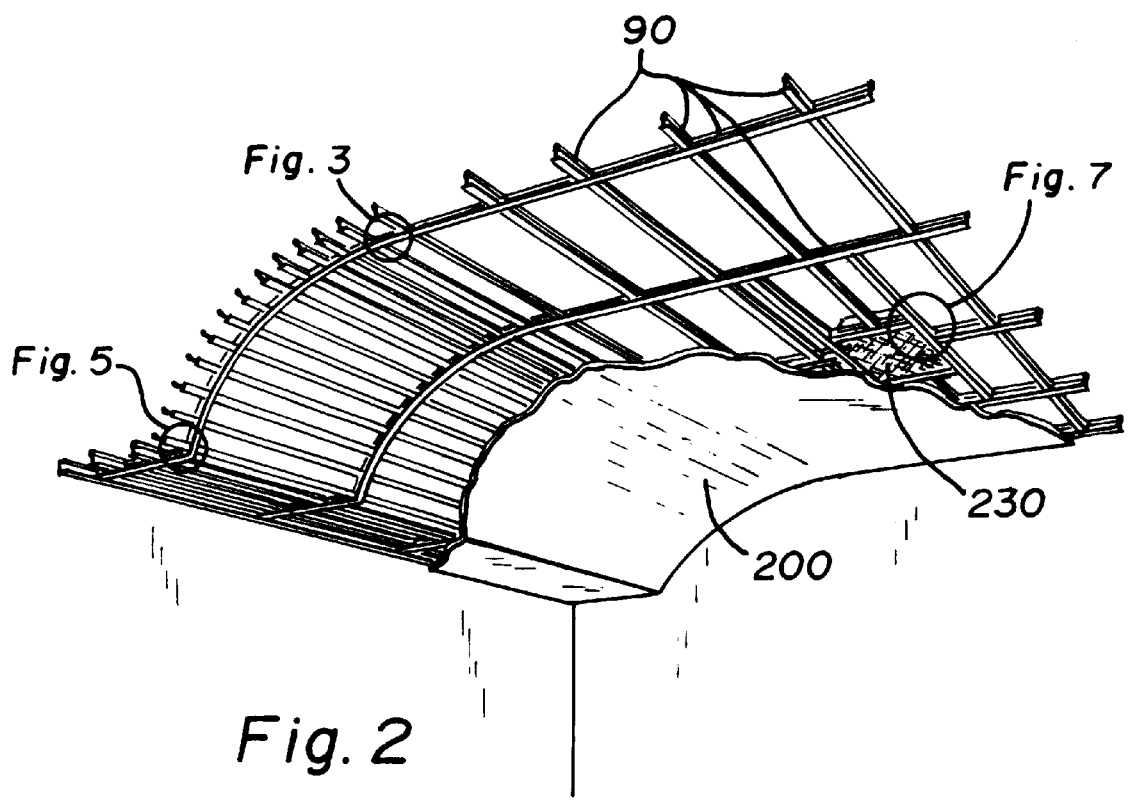
FIG. 2 is a perspective view of a suspended drywall ceiling, with a portion of the drywall cut away, thus exposing a suspended "T" grid system.

FIG. 2 shows a typical suspended drywall ceiling constructed with suspended "T" grid beams 90. A "T" grid beam is a beam, that when connected together with other "T" grid beams via a plurality of the clips 100, forms a grid system upon which drywall 200 can be attached. Other panels, such as lay-in acoustical panels, may also be attached upon the grid system. FIG. 11 shows an end view of a "T" grid beam 90 attached to the clip 100. The "T" grid beam 90 has a stiffening "bulb" portion 91, a central web portion 96, and a base portion 92. The base portion 92 forms the arms of the "T" shape and has a grid face 93 and a back surface 94. When a "T" grid beam 90 is attached to the clip 100, the "bulb" portion 91 of the "T" grid beam 90, at the top of the central web portion 96, is inserted into the retainer channel 12. Some "T" grid beams do not have a "bulb" portion 91 at the top of the central web portion 96. However, the clip 100 is compatible with both types of beams. The oval bosses 20 and 21 provide bearing surfaces against the central web surfaces 98 of the "T" grid beams 90, as shown in FIG. 11. The clip 100 may be secured to "T" grid beams 90 by mechanical fasteners, such as sheet metal screws, inserted through one or more of the holes 36 and 38 of the oval bosses 20 and 21, respectively, or holes 39 in the retainer channel 12.

Figure 7:
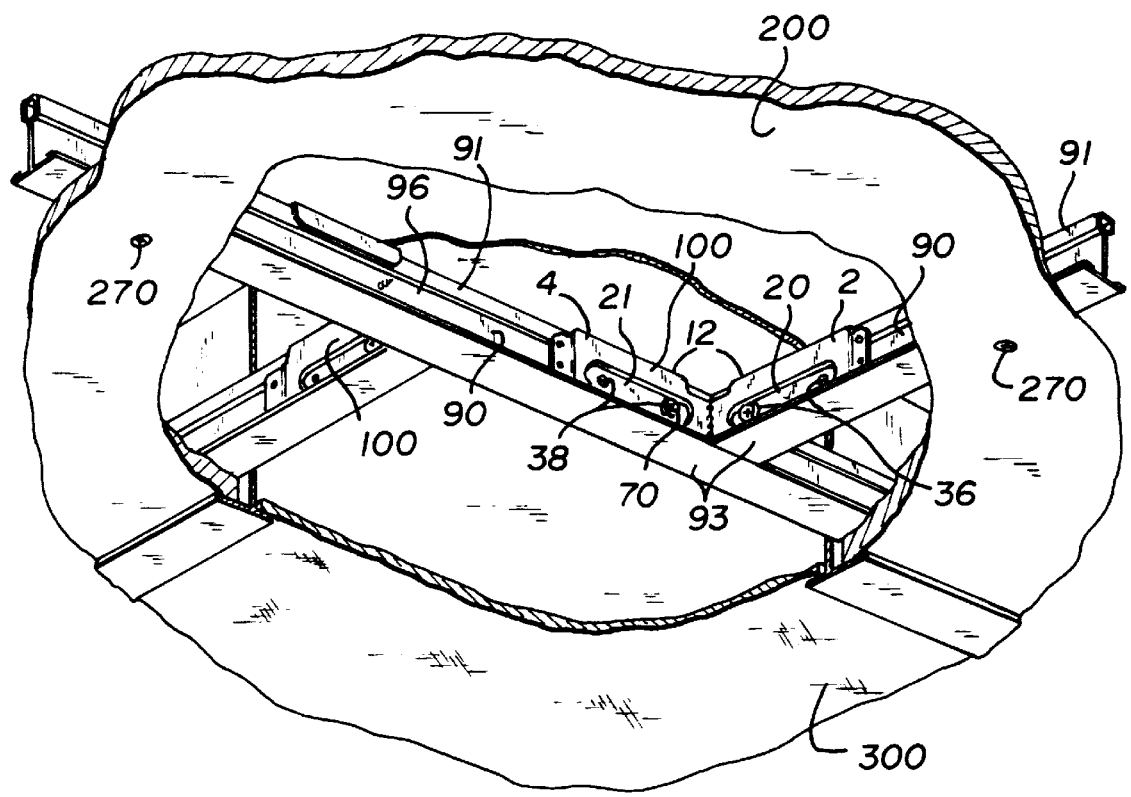
FIG. 7 is a detailed view of FIG. 2, using the bent clip reconfiguration of FIG. 6, with the drywall and light fixture cover surfaces cut away, showing the bent clip used for connection between two suspended "T" grid beams at a point where one suspended "T" grid beam meets another suspended "T" grid beam transversely oriented to the other beam, the transversely oriented beam being a part of the frame for the ceiling light fixture.

FIG. 2 shows several locations where two "T" grid beams 90 are fastened together by one of the clips 100 at points of intersection and transition in a suspended drywall ceiling, such as at a point of surface transition or where a "T" grid beam 90 encounters another "T" grid beam 90 forming a ceiling fixture frame 230. These situations can also be encountered when installing other panels upon the grid system, such as lay-in acoustical panels. FIGS. 3, 5, and 7 show the detail of three typical intersection and transition points where the clip 100 may be used. However, the clip 100 is not limited to these situations only. FIGS. 3, 5, 7, and 11 depict "T" grid beams 90 in various arrangements all having the same construction as "T" grid beam 90 and having the same corresponding features but differing only in length and/or by being curved or straight. Such corresponding features shall therefore be identified by the same reference numbers.

The clip 100 may be used at a point of transition between a curved "T" grid beam 90 at the left of the clip midpoint 60 and a straight "T" grid beam 90 to the right of the clip midpoint 60, as shown in FIG. 3. In this situation, both "T" grid beams 90 form a transition from a curved surface portion C of drywall 200 to a tangent planar surface portion P of drywall 200. The "T" grid beams 90 are spliced together by the clip 100. The "bulb" portion 91 of the left "T" grid beam 90 is inserted into the retainer channel 12 at the second clip half 4. The "bulb" portion 91 of the right "T" grid beam 90 is inserted into the retainer channel 12 at the first clip half 2. Both "T" grid beams 90 are abutted end-to-end generally at the midpoint 60 of the clip 100, such that the grid faces 93 of both "T" grid beams 90 form a continuous surface. The "T" grid beams 90 are then fastened to the clip 100 by mechanical means, such as sheet metal screws 70 through one or more of the holes 36 and 38 in the oval bosses 20 and 21. The drywall 200 is attached to the grid faces 93 of the "T" grid beams 90 typically by mechanical means, such as drywall screws 270. However, the drywall 200 may also be attached by adhesive means. In one alternate embodiment, other type panels, such as lay-in acoustical panels, may instead be laid upon the back surface 94 of the "T" grid beams 90.

FIG. 5 shows a point of transition where two surfaces of drywall 200 of a ceiling intersect at an angle. The drywall 200 may be made planar or curved. In FIG. 5 a left "T" grid beam 90 is straight horizontally and is attached to a curved right "T" grid beam 90. This type of attachment requires a two piece re-configuration of the clip 100, as shown in FIG. 4. The first clip half 2 is separated from the second clip half 4 by removing the retainer channel spine 54 and severing the clip 100 at the midpoint 60 along the perforated holes 40, thus forming two separated pieces, or halves, 2 and 4. The clip half 4 is then reversed 180° and loosely pivotally fastened to the first clip half 2 at the hole 30 of the first extension flange 8 and at the hole 32 of the second extension flange 10 by means of a pivot pin 72 inserted through the holes 30 and 32. In a preferred embodiment of the clip 100, the first extension flange 8 is offset from the clip 100 in an opposite direction of the offset between the second extension flange 10 and the clip 100, both offsets being equal. These offsets allow the first clip half 2 and the second clip half 4 to be fastened so that both severed portions of the retainer channel 12 may be aligned in the same plane of the "bulb" portions 91 of the two intersecting "T" grid beams 90. FIG. 4 illustrates the pivotal attachment of the first clip half 2 and the second clip half 4 of this two piece reconfiguration of the clip 100. Referring again to FIG. 5, both of the "T" grid beams 90 are then attached to the two piece re-configuration of the clip 100 by inserting the "bulb" portions 91 of both "T" grid beams 90 into the severed portions of the retainer channel 12 on both clip halves 2 and 4 of the clip 100. The "T" grid beams 90 are then fastened to the clip 100 by mechanical means, such as sheet metal screws 70, through one or more of the holes 36 and 38 or holes 39. The drywall 200 is then attached to the grid faces 93 of the "T" grid beams 90 by mechanical or adhesive means.

Figure 6:
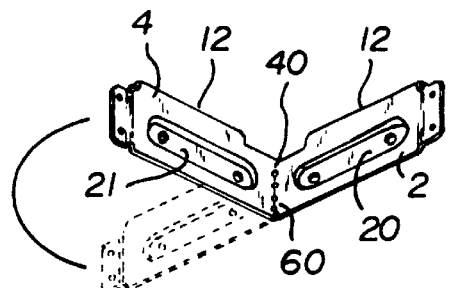
FIG. 6 is a perspective view of a reconfigured clip being bent along the perforation holes such that one half of the clip is transverse to the other half of the clip, the connecting spine of the channel notch being severed to accommodate case of bending.

Another point of intersection or grid orientation encountered in a suspended "T" grid ceiling is where a "T" grid beam 90 terminates at a "T" grid beam 90 running perpendicular to it, as shown in FIG. 7. This situation is typically encountered where a "T" grid beam 90 must terminate at an opening, such as for a ceiling fixture 300, at a point on the perpendicular "T" grid beam 90 between the standard interval locations of the slots on the center web portion 96 of the "T" grid beam 90. This type of application utilizes a bent, but still integral, re-configuration of the clip 100, as shown at two intersections in FIG. 6. The spine 54 of the clip 100 is removed and the clip 100 is bent at the clip midpoint 60 at the line of the perforated holes 40 in a direction opposite of the direction in which the oval bosses 20 and 21 project, such that the first clip half 2 and the second clip half 4 are transverse to each other, as shown in FIG. 6. The clip 100 is bent in this way so that the bosses 20 and 21 abut against the central web portions 96 of the "T" grid beams 90 when the clip 100 is attached. Both of the clips 100 in FIG. 7 are shown in the perpendicular mounting situation. The clip 100 in this bent configuration is attached to the perpendicular "T" grid beams 90 by inserting the "bulb" portions 91 of both "T" grid beams 90 into the portions of the retainer channel 12 on each clip half 2 and 4. The "T" grid beams 90 are then fastened to the clip 100 by mechanical means, such as sheet metal screws 70, through one or more of the holes 36 and 38 of the bosses 20 and 21, where the bosses 20 and 21 bear against the central web portions 96 of the "T" grid beams 90 to reinforce the clip attachment, or through the holes 39 of the retainer channel 12.

FIG. 12 shows an alternate embodiment at clip 100'. The retainer member of the clip 100' in this embodiment comprises bendable retainer tabs 82 and 84, bendable along slots 83 and 85, respectively. The retainer tabs 82 and 84 are bent over the top portion of the central web portion of a "T" grid beam in order to secure the clip 100' in place. Instead of having a retainer channel, as in the clip 100 already formed on the clip, the retainer tabs 82 and 84 can be manually bent in the field during installation. FIG. 12 also illustrates extension flanges 80 and 81 without offsets. However, extension flanges 80 and 81 can also have offsets, as shown in the preferred embodiment of FIG. 1.

In the preferred embodiment of the invention, clip half or piece 2 and clip half or piece 4 are of the same length. However, the clip 100 does not have to be defined in equal length portions. Each piece 2 or 4 of the clip 100, divided by the perforated holes 40, may be of different lengths to accommodate various situations.

While specific embodiments of the present invention have been shown here for the purposes of explaining preferred and alternate embodiments of the invention, it is to be understood that the appended claims have a wide range of equivalents and a broader scope than the embodiments disclosed.

What is claimed is:

1. A clip for suspension ceiling grid beams comprising:
    a first clip piece having a first side;
    a second clip piece having a first side, said second clip piece being substantially co-linear with and having an integral connection to said first clip piece;
    a substantially integral retainer member formed along said first and second clip pieces extending co-linearly along a common edge of said first and second clip pieces and projecting away from the first sides of said first and second clip pieces, said retainer member having a notch spanning said integral connection; and
    a weakened zone generally at said integral connection between said first and second clip pieces and non-parallel to said common edge thereof, said clip being bendable at said zone.
2. The clip as recited in claim 1, wherein said retainer member is a channel formed along said edge.

3. The clip as recited in claim 1, wherein said first clip piece has an end extension flange extending generally parallel to said common edge.
4. The clip as recited in claim 3, wherein said extension flange has holes therethrough.
5. The clip as recited in claim 3, wherein said second clip piece has an end extension flange extending generally parallel to said common edge.
6. The clip as recited in claim 5, wherein said extension flanges have holes therethrough.
7. The clip as recited in claim 1, wherein said first and second clip pieces having raised bosses thereon, said bosses projecting outwardly from the first sides of said first and second clip pieces.
8. The clip as recited in claim 7, wherein said raised bosses having holes therethrough.
9. The clip as recited in claim 1, wherein said clip is formed out of metal.
10. The clip as recited in claim 7, wherein said raised bosses are stamped to project from said clip.
11. The clip as recited in claim 1, wherein said first and second clip pieces are of equal portions.
12. The clip as recited in claim 1, wherein said retainer member comprises bendable tabs formed along said edge.
13. A system of joined grid beams comprising:
    an intersection of at least two grid beams, each said grid beam having two ends, a base portion having a grid face and a back surface, a web portion having two sides, a top portion, and extending from the base portion;
    a clip having a first clip piece, a second clip piece co-linearly formed and having an integral connection with said first clip piece, and a retainer member formed along an edge of said clip pieces, said retainer member having a notch positioned generally at said integral connection, said top portion of each of said at least two grid beams retained by the retainer member, said first clip piece being bendable and severable along a weakened zone generally at the integral connection of said clip pieces; and
    means for securing said first and second clip pieces to said web portions of said at least two grid beams;
    wherein said clip joins said at least two grid beams.
14. The system of joined grid beams as recited in claim 13, wherein the intersection of said at least two grid beams comprises the meeting of the ends of the at least two grid beams, where the grid beams are co-linear.
15. A system of joined grid beams comprising:
    an intersection of at least two grid beams, each said grid beam having two ends, a base portion having a grid face and a back surface, a web portion having two sides, a top portion, and extending from the base portion;
    wherein the intersection of said at least two grid beams comprises the meeting of the ends of the at least two grid beams at an angle;
    a clip having a first clip piece, a second clip piece bendably and severable formed with said first clip piece, and a retainer member formed along an edge of said clip pieces, said top portion of each of said at least two grid beams retained by the retainer member; and
    means for securing said first and second clip pieces to said web portions of said at least two grid beams;
    wherein said clip is severed into said second clip piece and said first clip piece and said clip pieces are pivotally joined to connect said at least two grid beams.

16. The system of joined grid beams as recited in claim 15, wherein the web portions of said intersecting grid beams are co-planar.

17. The system of joined grid beams as recited in claim 15, wherein at least one of said two grid beams is curved for at least a part of its length.

18. The system of joined grid beams as recited in claim 15, wherein the intersection of said at least two grid beams is curved for at least a part of its length.

19. The system of joined grid beams as recited in claim 18, wherein the angle is a right angle.

20. A method of connecting two suspension grid beams comprising the steps of:

retaining a first suspension grid beam at a clip at a first portion of a substantially integral and co-linear retainer member of said clip, whereby said first portion of said substantially integral and co-linear retainer member is in contact with a top portion of said first suspension grid beam securing said first suspension grid beam to said clip;

retaining a second suspension grid beam at a second portion of said substantially integral and co-linear retainer member of said clip, whereby said second portion of said substantially integral and co-linear retainer member is in contact with a top portion of said second suspension grid beam;

said first and second portions of said substantially integral and co-linear retainer member being defined by a centralized notch; and securing said second suspension grid beam to said clip.

21. A method of connecting two suspension grid beams comprising the steps of:

severing an integral clip at a zone formed non-parallel to an edge of two integrally connected clip pieces, thereby creating separate first and second clip pieces;

pivotally attaching said first and second clip pieces together by mechanically securing extension flanges of said first and second clip pieces, said attachment thereby allowing said first and second clip pieces to pivot with respect to each other;

retaining a first suspension grid beam at a retainer member portion of said first clip piece;

mechanically securing said first suspension grid beam to said first clip piece;

retaining a second suspension grid beam at a retainer member of said second clip piece; and mechanically securing said second suspension grid beam to said second clip piece.

22. A method of connecting two suspension grid beams comprising the steps of:

removing at least a portion of a spine of a substantially integral and co-linear retainer member of an integral clip;

bending said integral clip at a weakened zone formed non-parallel to an edge of a first clip piece and an integrally connected second clip piece, thereby forming an angle between said clip pieces of said integral clip;

retaining a first suspension grid beam at said first clip piece at a first portion of said retainer member, whereby said first portion of said retainer member is in contact with a top portion of said first suspension grid beam;

securing said first suspension grid beam to said first clip piece;

retaining a second suspension grid beam at said second clip piece at a second portion of said retainer member, whereby said second portion of said retainer member is in contact with a top portion of said second suspension grid beam; and securing said second suspension grid beam to said second clip piece.

* * * * *